United States Patent
Ebersole et al.

(10) Patent No.: US 6,903,752 B2
(45) Date of Patent: Jun. 7, 2005

(54) METHOD TO VIEW UNSEEN ATMOSPHERIC PHENOMENON USING AUGMENTED REALITY

(75) Inventors: John Franklin Ebersole, Bedford, NH (US); Mark Stanley Bastian, Manchester, NH (US); John Franklin Walker, W. Dundee, IL (US); Richard Wade Madison, Mission Viejo, CA (US); John Franklin Ebersole, Jr., Bedford, NH (US)

(73) Assignee: Information Decision Technologies, LLC, Bedford, NH (US)

( * ) Notice: Subject to any disclaimer, the term of this patent is extended or adjusted under 35 U.S.C. 154(b) by 236 days.

(21) Appl. No.: 10/192,195

(22) Filed: Jul. 10, 2002

(65) Prior Publication Data

US 2003/0025714 A1 Feb. 6, 2003

Related U.S. Application Data (60) Provisional application No. 60/305,677, filed on Jul. 16, 2001, and provisional application No. 60/307,278, filed on Jul. 23, 2001.

(51) Int. Cl.$^7$ ................................................. G09G 5/00
(52) U.S. Cl. ....................... 345/632; 345/633; 345/634; 340/953
(58) Field of Search ................................. 345/632, 633, 345/634; 340/953, 968; 434/28, 38

(56) References Cited

U.S. PATENT DOCUMENTS

| | | | | | |
|---|---|---|---|---|---|
| 4,079,905 A | * | 3/1978 | Greene | ........................ | 244/191 |
| 4,586,140 A | * | 4/1986 | Millen | .......................... | 701/10 |
| 5,262,773 A | * | 11/1993 | Gordon | ....................... | 340/968 |
| 5,309,169 A | * | 5/1994 | Lippert | ........................... | 345/8 |
| 5,541,591 A | * | 7/1996 | Bush | .......................... | 340/968 |
| 5,815,411 A | * | 9/1998 | Ellenby et al. | ............. | 702/150 |
| 6,066,046 A | * | 5/2000 | Yamamoto | ..................... | 463/7 |
| 6,483,948 B1 | * | 11/2002 | Spink et al. | ................. | 382/255 |

* cited by examiner

*Primary Examiner*—Amare Mengistu
*Assistant Examiner*—Tom Sheng
(74) *Attorney, Agent, or Firm*—Brian M. Dingman, Esq.; Mirick, O'Connell, DeMallie & Lougee, LLP (57) ABSTRACT

The invention is a method for displaying otherwise unseen atmospheric phenomenon using augmented reality (the mixing of real media with computer generated media). The method uses computer generated images to represent existing weather conditions and presents this data to the user by combining the computer generated images with the user's real environment. Computer generated images are used to represent such weather phenomenon as wake vortices, wind shear, and microbursts. These images are represented in such a way as to intuitively display relevant properties of the phenomenon to the system user, which increases the user's situational awareness and safety. The primary intended applications are for air traffic controllers and pilots to view these disturbances.

35 Claims, 12 Drawing Sheets

METHOD TO VIEW UNSEEN ATMOSPHERIC PHENOMENON USING AUGMENTED REALITY

CROSS REFERENCE TO RELATED APPLICATIONS

This application claims priority of Provisional patent application 60/305,677 filed Jul. 16, 2001, and Provisional patent application 60/307,278 filed Jul. 23, 2001, and is a Continuation in Part of "Augmented Reality Navigation Aid" Ser. No. 09/634,203 filed Aug. 9, 2000.

TECHNICAL FIELD OF THE INVENTION

This invention relates to the fields of air traffic safety, air traffic control, atmospheric phenomena, and augmented reality (AR). The purpose of the invention is to allow air traffic controllers and pilots to visualize otherwise invisible weather phenomena in a simple, intuitive, and informative interface.

COPYRIGHT INFORMATION

A portion of the disclosure of this patent document contains material that is subject to copyright protection. The copyright owner has no objection to the facsimile reproduction by anyone of the patent document or the patent disclosure as it appears in the Patent and Trademark Office records but otherwise reserves all copyright works whatsoever.

BACKGROUND OF THE INVENTION

In the past two decades, air travel has become increasingly less expensive. This decrease in air travel cost has led to congestion of airways and runways across the United States. This congestion can only be alleviated by increasing runway space, decreasing the number of planes in the air, or utilizing current resources more efficiently. Unfortunately, new runways are expensive and take a long time to build. Also, airlines and passengers alike have no desire to decrease the current number of flights. This leads to a requirement that current runways and airways be used more efficiently. Additionally, engineering advancements have allowed for the periodic collection of atmospheric data from the airways around and between airports around the world. Furthermore, this data can be enhanced by a computational model to achieve a near-continuous stream of information on local atmospheric conditions.

Currently, runway and airway usage is limited by preventative measures taken to eliminate the danger of invisible, atmospheric phenomena. Wake vortices, columns of swirling, turbulent air, shed by the wings of aircraft, linger in air lanes and on runways at airports. These vortices can cause severe damage to another aircraft that flies into their path, and can cause an aircraft to lose control, possibly crashing. Small aircraft can even be flipped upside-down by these vortices. Currently, fixed times and distances are set between aircraft departures and landings on a given runway, as determined by FAA regulations. These regulations are based on worst-case scenarios for time taken for a vortex to dissipate, therefore these intervals have a high safety factor.

Similarly, airway usage is limited by measures taken to avoid natural atmospheric phenomena, such as microbursts, wind shear, and turbulence. Flying through such phenomena can cause a plane to become temporarily unflyable, possibly resulting in a crash. Thus, aircraft attempt to fly around areas with conditions associated with these phenomena—but only if they know of their presence. This rerouting costs time, possibly delaying the flight and impacting any other flights that depend on the aircraft's crew, passengers, gate, or runway slot. However, for safety, detours can be made, based on worst-case assumptions about the offending atmospheric phenomena.

The above methodology (using worst case scenarios to estimate atmospheric phenomena) is used because air traffic controllers, radar operators, and pilots cannot see the dangerous vortices and other phenomena on the runways and in the air lanes. If a method were developed for visualizing these phenomena, then air traffic controllers could authorize the launch or landing of aircraft as soon as the runway was clear of vortex trails, rather than waiting the maximum amount of time necessary for the vortices to dissipate. This savings in time, made by increasing landing and departure frequency, would significantly alleviate the problem or air traffic congestion. Additionally, significant fuel savings would be made by getting planes in the sky rather than having them idle on the tarmac. Similarly, by seeing the estimates of the size and strength of disturbances in the air lanes, air traffic controllers could request smaller detours, allowing the aircraft to proceed with less delay and less fuel consumption, and allowing larger planes to go through small disturbances that would be unsafe for smaller aircraft. Visualizing dangerous atmospheric phenomena while airborne will also increase aircraft safety and decrease fuel costs.

SUMMARY OF THE INVENTION

This invention utilizes augmented reality (AR) technology to display otherwise invisible atmospheric phenomena overlaid on the real world in an intuitive, user-friendly format to a pilot or air traffic controller, who can then decide if and when it is safe to fly. AR is defined in this application to mean combining computer-generated graphical elements with a real world image (which may be static or changing) and presenting the combined image as a replacement for the real world image. Additionally, these graphical images can be used to present the user with an idea of the extent of the current atmospheric phenomenon. For example, near the center of a representative image, the image may be darkened to suggest extreme danger. At the edges, the image may be light or semitransparent, suggesting an approximate edge to the danger zone where effects may not be as severe.

This data may be presented using traditional interfaces such as monitors and televisions, or it may be projected into a head-mounted display (HMD). In any case, the real image of the airfield or airway, along with accompanying structures and aircraft, will be shown, overlaid with computer-generated graphical elements of the atmospheric phenomena. The net result is an augmented reality.

This invention features a method for viewing data on atmospheric phenomena collected by a third-party system. Such data on atmospheric phenomena is of little use to the pilot or air traffic controller (ATC) unless it is presented quickly in a simple and useful format. The invention described here includes a method for viewing atmospheric disturbances, including (but not limited to) wind shear, wingtip vortices, micro bursts, and clear air turbulence. One aspect of the inventive method uses blending of images with varying transparency to present the location, intensity, and other properties of the data being displayed. This will present the ATCs and pilots with a visual indication of properties of otherwise invisible atmospheric disturbances.

DETAILED DESCRIPTION OF THE PREFERRED EMBODIMENTS OF THE INVENTION

Figure 1:
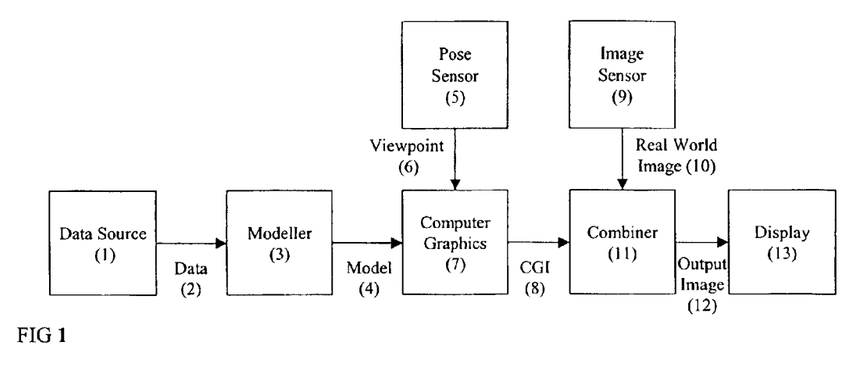
FIG. 1 is a block diagram of an embodiment of the method of this invention, labeling both data flow and operators.

FIG. 1 illustrates the data flow that defines the preferred method of the invention for visualizing otherwise invisible atmospheric phenomena. Data (2) can come from a variety of sources (1)—sensor data, human-reported data, or computer simulation data—concerning atmospheric phenomena in a particular area. The data (2) are used in a modeller (3) to create a model (4) of the atmospheric phenomena, or the atmosphere in the area. This model (4) and a viewpoint (6) from a pose sensor (5) are used by a computer (7) to render a computer-generated image (8) showing how the modeled phenomena would appear to an observer at the chosen viewpoint. "Viewpoint" is used to mean the position and orientation of an imaging sensor (i.e., any sensor which creates an image, such as a video camera, eye, or other instrument "seeing" the scene. Applying color or texture to the model of the otherwise invisible atmospheric phenomena allows the image to show the structure of the invisible phenomena to the observer. Next, the rendered image (8) is combined in a combiner (11) with an image of the real world (10) from image sensor (9), seen from the same viewpoint (6), to produce an output image (12) that is displayed (13). This latter process is commonly known as Augmented Reality.

The first step in the process is to gather data about relevant atmospheric phenomena. At least three pieces of data about a phenomenon are important—type, intensity, and extent. Types of phenomena include, for example, aircraft wingtip vortices and microbursts (downdrafts inside thunder clouds). Other important phenomena would include areas of wind shear and clouds with electrical activity. The type of phenomena is relevant because some phenomena are more likely to be dangerous, move faster, and/or dissipate faster than others. Each type may warrant a different amount of caution on the part of pilots and air traffic controllers. The intensity of a phenomenon is similarly important, as a weak and dissipating phenomenon may not require any special action, while a strong or growing one may require rerouting or delaying aircraft. The size of a phenomenon, meaning the region over which it has intensity above some threshold, is important, as it tells pilots and air traffic controllers how much of a detour is in order. Larger detours increase delays, and knowing the size, growth rate, and movement of the phenomenon allow pilots and air traffic controllers to estimate the minimum safe detour.

There are several possible sources of data about atmospheric phenomena. One source is sensors. Sensors at airports can provide data on local atmospheric phenomena, while sensors on aircraft provide data on conditions in the airways. A second data source is human observation. Pilots can report their locations as they experience the effect of atmospheric phenomena. As air traffic follows prescribed lanes, these observations may be useful to planes following in the same lane. Similarly, observations by an air traffic controller at an airport would be valid for more planes taking off and landing. A third possible source of this data is atmospheric simulation. For instance, based on known wind strength, and direction, and magnitude of turbulence, it may be possible to calculate the evolution of wingtip vortex positions. In the preferred embodiment, data about wingtip vortices could be taken as data from a simulation, or from airport sensors. These data would be based on the position and orientation of the aircraft over time, and simulations/assumptions regarding the amount of time required for the vortices to dissipate. Data about microbursts come from a point-and-click interface where a user selects the center of a microburst and can modify its reported size and intensity.

The second step in the visualization method involves a modeler (3) converting the data (2) into a model (4) of the atmosphere in a region. The preferred embodiment computes simulated points along possible paths of wingtip vortices of a (simulated) aircraft. Splines are then generated to interpolate the path of wingtip vortices between the known points. Other atmospheric phenomena are stored in a list, each with a center position, dimensions, and maximum intensity. A more accurate system might use more complicated representations, for instance allowing phenomena to have complex shapes (e.g., an anvil-shaped thunder cloud), or using voxels or vector fields for densely sampled regions. An alternative to representing the atmospheric phenomena with complex 3D geometric shapes, would be the use of icons (which may be simple or complex, depending on the preference of the user). The icons would require less rendering computer power, and might not clutter the display up as much. Furthermore, the use of a textual representation overlaid onto the display can show specifics of the phenomena such as type, speed, altitude, dimensions (size), and importance (to draw attention to more dangerous phenomena). The user may wish to display the textual display either by itself or in conjunction with the other display options of icons or 3D geometric shapes.

The third step in the visualization method uses computer graphics (7) to render a scene, defined by a model of the atmospheric phenomena (4), from a particular viewpoint (6), producing a computer-generated image (8). Although this can be done in many ways, the preferred embodiment uses the OpenGL® (SGI, Mountain View, Calif.) programming interface, drawing the models of the atmospheric phenomena as sets of triangles. The software in the preferred embodiment converts the splines that model wingtip vortices into a set of ribbons arranged in a star cross-section shape, which has the appearance of a tube in nearly any direction. Texture mapping provides a color fade from intense along the spline to transparent at the ribbon edges. For other phenomena, the software uses the technique of billboarding. The software finds a plane passing through a phenomenon's center location and normal to the line from viewpoint to center, uses the size of a phenomenon to determine the radius of a circle in that plane, and draws a fan of triangles to approximate that circle. Different colors are used for different types of phenomena, and alpha blending of these false colors shows an intensity falloff from the center to the edge of each phenomenon.

The next step in the visualization method is to acquire an image of the real world (10), using an image sensor (9), and to determine the viewpoint (6) from which that image was taken, using a pose sensor (5). There are several ways to accomplish this, depending on the hardware used to implement the method. In one reduction to practice, the image of the real world (10) is a static image of an airfield, taken from a birds-eye view by a camera, such as a satellite. Thus, the viewpoint (6) is fixed, pointing downward, and the pose sensor (5) consists of the programmer deducing the altitude of the viewpoint from the known size of objects appearing in the image. Alternately, the image of the real world can come from a ground-based stationary imaging sensor from a known viewpoint that is not a birds-eye view. This may be accomplished by mounting a camera (perhaps even one that can pan and tilt in a known, controlled manner) at an accurately known location on or near the airport. A similar embodiment could use a radar as the image sensor, and calculate the equivalent viewpoint of the image. A more complicated embodiment might use a camera or the user's eye(s) as the image sensor, and use a tracking system (common in the field of augmented reality such as the INTERSENSE IS-600 (Burlington, Mass.) as the pose sensor to determine the position and location of a camera, or the user's head. In this situation, the camera may be mounted on another person or portable platform, and the user would observe the resultant display at his or her location.

The remaining steps in this embodiment of the method are to combine the computer-generated image (8) with the real world image (10) in an image combiner (11) and to send the output image (12) to a display (13). Again, this can be done in many ways, known in the art, depending on the hardware used to implement the method.

Figure 2A:
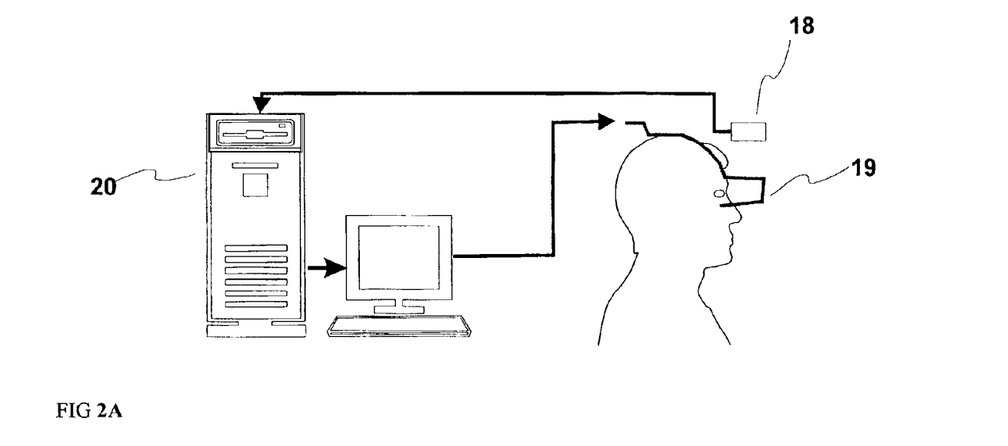
FIG. 2A is a schematic diagram of the hardware components and interconnectivity of a see-through augmented reality (AR) system that can be used in this invention.
Figure 2B:
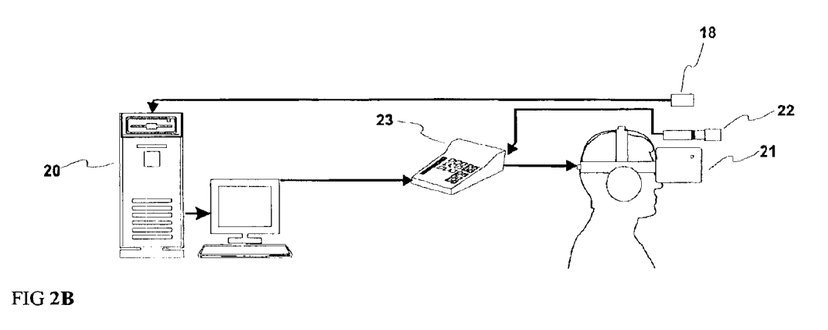
FIG. 2B is a schematic diagram of the hardware components and interconnectivity of a video-based AR system for this invention involving an external video mixer.
Figure 2C:
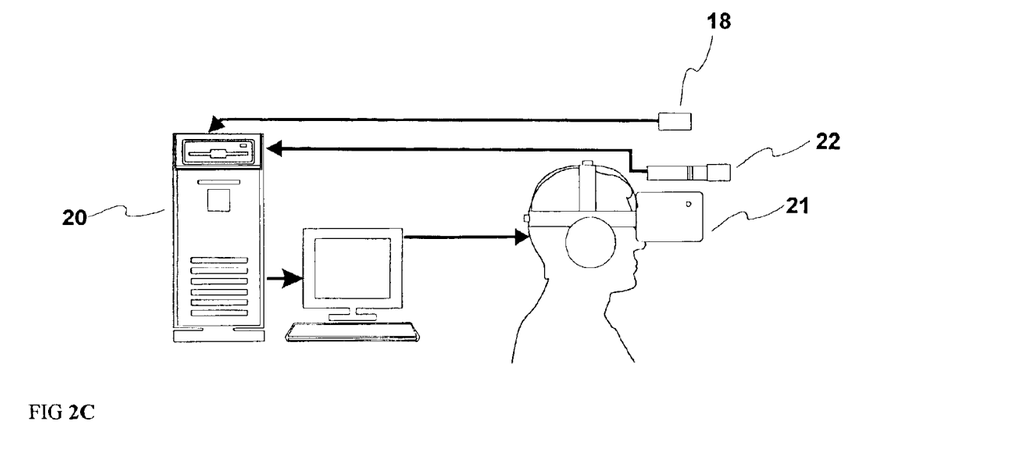
FIG. 2C is a schematic diagram of the hardware components and interconnectivity of a video-based AR system for this invention where video mixing is performed internally to a computer.
Figure 3:
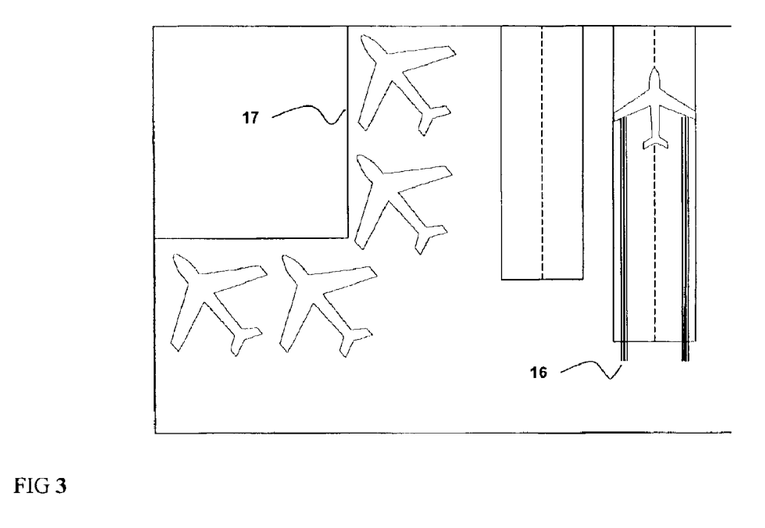
FIG. 3 is a representation of vortex trails being visualized behind an airplane.

Methodologies for mixing and presenting content (steps 11 to 13 of FIG. 1) are shown in FIGS. 2A, 2B, and 2C. In FIG. 2A a see-through augmented reality device is demonstrated. In this system, no automated mixing is required, as the image is projected directly over what the viewer sees through a semi-transparent display (19), as may be accomplished with partial mirrors. In FIG. 2B, the mixing of real and virtual images (augmented reality) is performed using an external video mixer (23). The real image is acquired by a camera (22) on the viewer's head, which is tracked by a 6DOF tracker (18). FIG. 2C is identical to FIG. 2B except that the real and virtual portions of the image are mixed on the computer's (20) internal video card, so an external mixer is not required. In addition to displaying the image to a viewer's eyes through a Head-Mounted Display (HMD) (21), the composite image can be displayed in any video device, such as a monitor, television, heads-up-display, a moveable display that the user can rotate around that will provide an appropriate view based on how the display is rotated, or a display mounted on a monocular or a pair of binoculars.

FIGS. 3 to 10 show examples of different displays accomplished by the invention. The images consist of virtual images and virtual objects overlaid on real backgrounds. In these images, intuitive representations have been created to represent important atmospheric phenomenon that are otherwise invisible.

FIGS. 3 to 6 show one application of top-down viewing of an airspace. The images demonstrate that trailing wingtip vortex data can be visualized such that the user can see the position and intensity of local atmospheric data (16). Airplanes can be represented as icons in cases where the planes are too small to see easily. Multiple planes and atmospheric disturbances can be overlaid on the same image.

Figure 4:
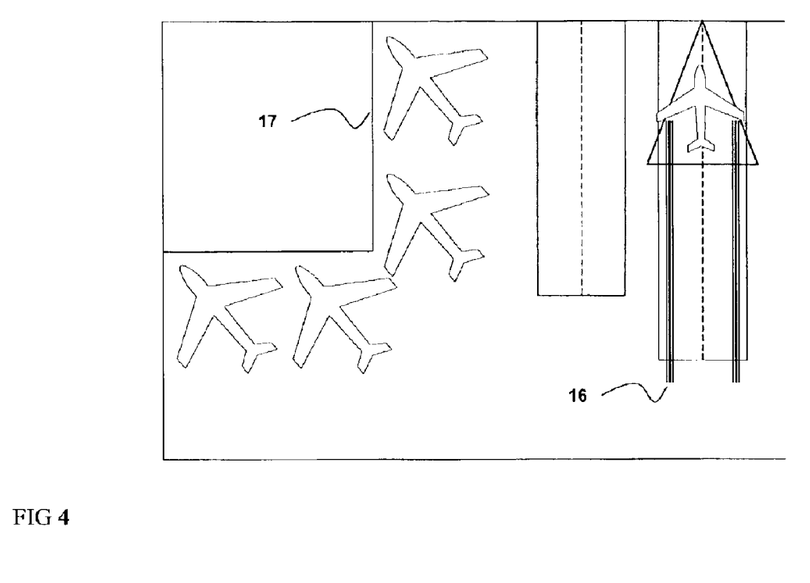
FIG. 4 is a representation of vortex trails being visualized.

In FIG. 4, triangular icons are used to better indicate the relevant airplane.

Figure 5:
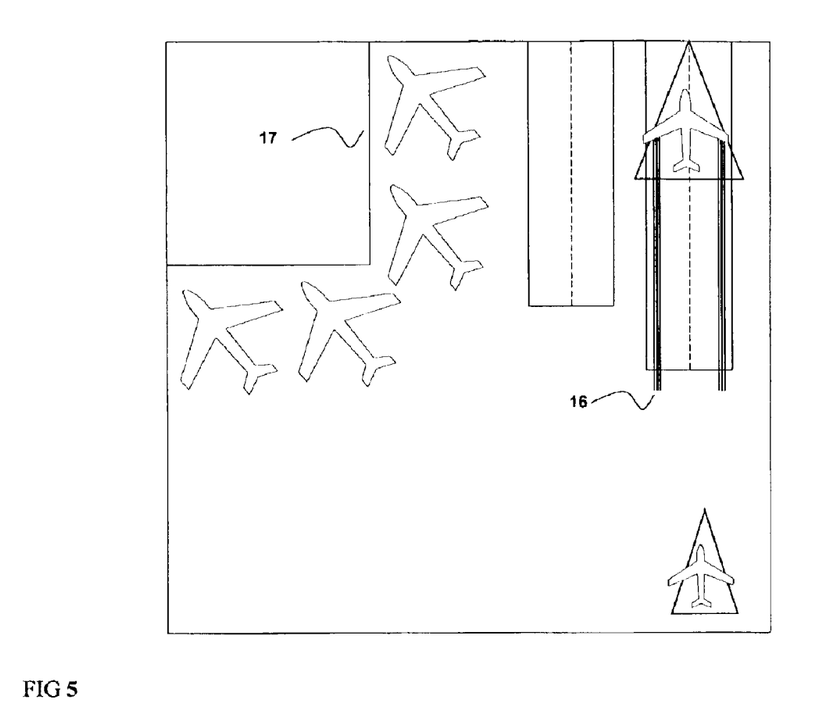
FIG. 5 is another representation of wingtip vortices as viewed at a farther distance.

In FIG. 5, the pilot of the aft plane can see that the pattern is clear directly in front of him.

Figure 6:
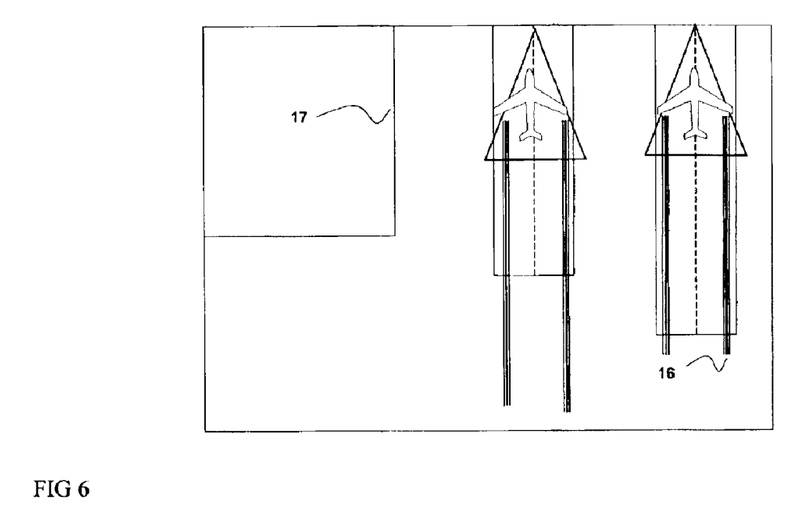
FIG. 6 is a similar top view of parallel takeoff of aircraft.

In FIG. 6 note that the vortex trails (16) are easily seen for use by air control personnel in the terminal (17).

Figure 7:
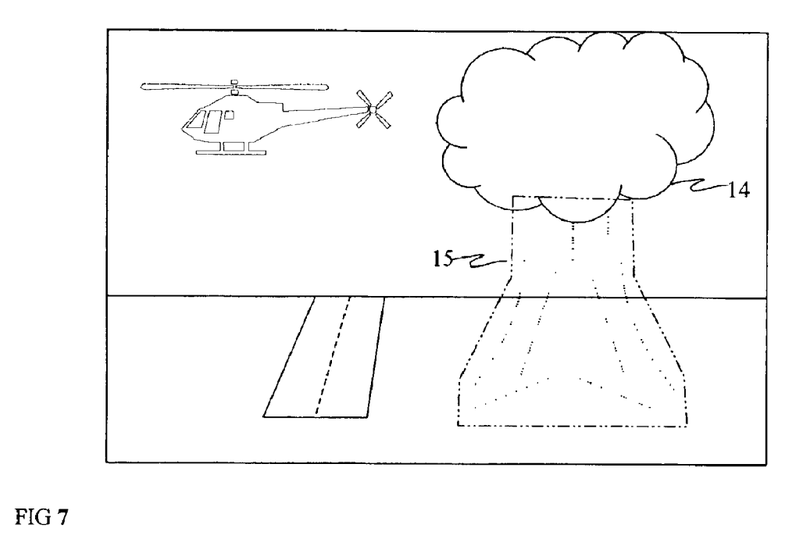
FIG. 7 depicts atmospheric phenomena, with an image of nonhomogeneous transparency used to convey information.
Figure 8:
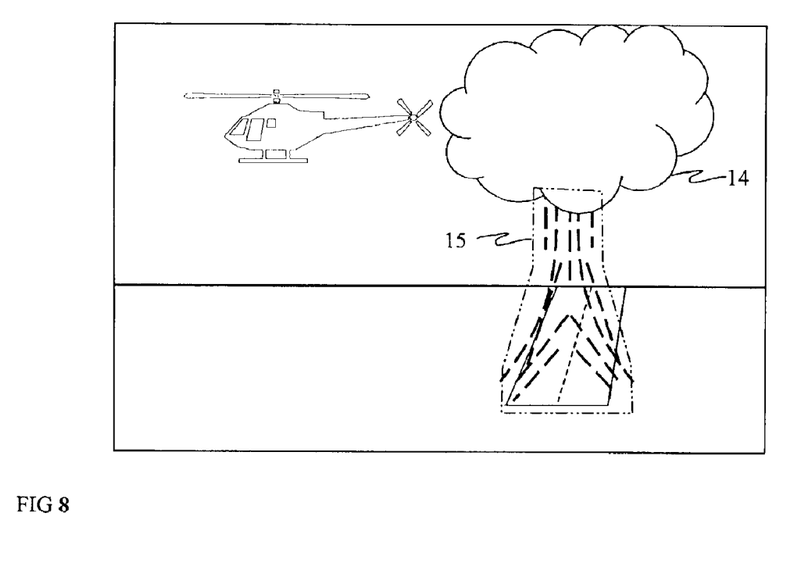
FIG. 8 depicts atmospheric phenomena.

FIGS. 7 to 8 show examples of a pilot's augmented view. The figures show that data such as wind shear and microbursts can be represented as virtual objects (15) projected onto the viewer's display. Properties such as color, transparency, intensity, and size can be used to represent the various properties of the atmospheric phenomenon (14). In the case of FIG. 8, the dashed line (which could be a change of color in the display) of the marker has changed, which could represent a change in phenomena type.

Figure 9:
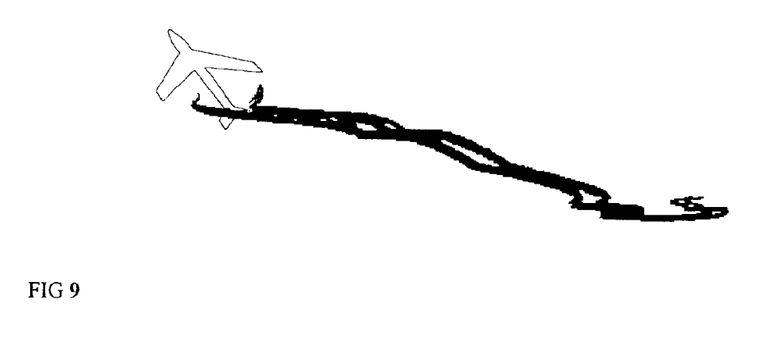
FIG. 9 shows an example of an irregular display of vortex trails.
Figure 10:
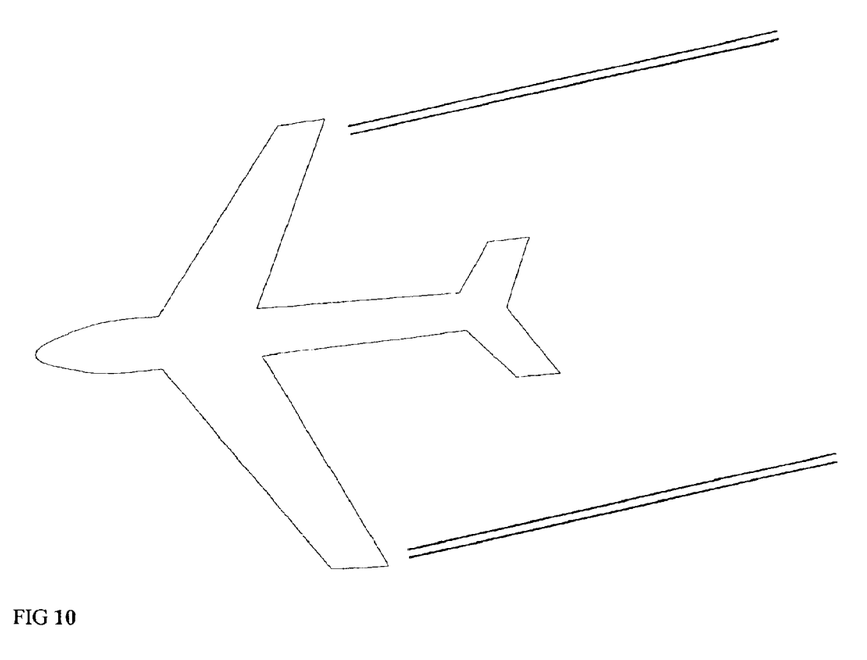
FIG. 10 shows representations of wingtip vortices visualized behind the wings of a real model airplane.

FIGS. 9 to 10 show examples of an airplane overlaid with virtual wake vortices, demonstrating the power of applying virtual representations of data to real images. Fuzziness or blending can be used to show that the edges of the vortex trails are not discrete, but that the area of influence fades as you move away from the center of the vortex.

The AR preferred embodiment of this invention can be reduced to practice using the hardware and software documented in Table 1.

TABLE 1

Equipment List.

| Item | Brand Name |
| --- | --- |
| IS-600 Mark 2 Plus | INTERSENSE |
| Cable, 9-pin serial (12') | |
| Camera control unit | PANASONIC |
| Camera control power cord | PANASONIC |
| Cable, S-Video | |
| Camera, mini | PANASONIC |
| Lens, GP-LM7TA | PANASONIC |
| Cable, 25-pin (10') | PANASONIC |
| Helmet, VR4 | VIRTUAL RESEARCH, Aptos, CA |
| Control box, VR4 helmet | VIRTUAL RESEARCH |
| Power supply | VIRTUAL RESEARCH |
| SGI 320 Workstation ("Dante") | SGI |
| TV Converter | AVERKEY3 |
| Video Monitor | SONY TRINITRON MONITOR 7" |
| Surge Protector, 6-way | DYNATECH |
| Visual C++ 6.0 (CD) | MICROSOFT |
| MX-1 Digital Video Mixer | VIDEONICS |

What is claimed is:

1. A method for presenting invisible atmospheric phenomena to an occupant of an aircraft using data about atmospheric information comprising:

using a computer to render an image representing the atmospheric phenomena information from the point of view of the aircraft occupant, the phenomena including wingtip vortices from aircraft in the area, microbursts, wind shear, and clear air turbulence;

wherein said rendered image clearly shows the type, intensity, and spatial extent of the atmospheric phenomena by drawing graphical representations and icons of multiple colors, and various sizes and shapes, and by using techniques comprising fuzziness, fading, transparency, and blending;

wherein said rendered image clearly shows the locations of all aircraft in the local area that may cause or come in contact with atmospheric phenomena;

providing an image or view of the real world;

augmenting the image or view of the real world with the rendered image; and presenting the augmented view to the aircraft occupant with a display comprising a heads-up display, or head mounted display that is worn by the aircraft occupant;

wherein the position and orientation of this display or of the occupant's head is determined in relation to the earth in six degrees of freedom, thereby allowing the image to be rendered from the point of view of the occupant, to disseminate atmospheric phenomenon information to the occupant.

2. The method of claim 1 in which providing an image comprises using a camera to capture the real world image, and wherein the presenting step accomplishes a display of the video-based augmented-reality image onto the display.

3. The method of claim 1 in which the presenting step accomplishes a see-through-based augmented reality display of the rendered image on a see-through head mounted display, which allows the view of the real world to be directly visible to the occupant through the use of partial mirrors, to which the rendered image is added.

4. The method of claim 1 in which the data are derived from sensors which acquire atmospheric data.

5. The method of claim 1 in which the data are derived from direct observation by a human.

6. The method of claim 5 in which the human observations are provided by one or more pilots.

7. The method of claim 5 in which the human observations are provided by one or more air traffic controllers.

8. The method of claim 1 in which the data are derived from atmospheric computer simulation.

9. The method of claim 1 in which information about the atmospheric phenomena displayed to the user via text, where the text is drawn onto a view of a real background, appearing near the atmospheric phenomenon the text is describing, and the text is visually anchored to that physical phenomenon.

10. The method of claim 9 in which the textual display is displayed to the user at the same time that non-textual graphics are displayed to the user.

11. A method for presenting invisible atmospheric phenomena to a user using data about atmospheric information comprising:

using a computer to render an image representing the atmospheric phenomena information from the point of view of the user, the phenomena including wingtip vortices from aircraft in the area, microbursts, wind shear, and clear air turbulence;

wherein said rendered image clearly shows the type, intensity, and spatial extent of the atmospheric phenomena by drawing graphical representations and icons of multiple colors, various sizes and shapes, and by using techniques comprising fuzziness, fading, transparency, and blending;

wherein said rendered image clearly shows the locations of all aircraft in the local area that may cause or come in contact with atmospheric phenomena;

providing an image or view of the real world;

augmenting the image or view of the real world with the rendered image; and presenting the augmented view to the user, to disseminate atmospheric phenomenon information.

12. The method of claim 11, in which a tracking system is used to track the user's viewpoint of the real world, and display the augmented view on a head mounted display worn by the user.

13. The method of claim 12, in which providing an image comprises using a camera to capture the real world image, and wherein the presenting step accomplishes a display of the video-based augmented-reality image onto the head mounted display.

14. The method of claim 12, in which the presenting step accomplishes a see-through-based augmented reality display of the rendered image on a see-through head mounted display, which allows the view of the real world to be directly visible to the user through the use of partial mirrors, to which the rendered image is added.

15. The method of claim 11 in which the data are derived from sensors which acquire atmospheric data.

16. The method of claim 11 in which the data are derived from direct observation by a human.

17. The method of claim 16 in which the human observations are provided by one or more pilots.

18. The method of claim 16 in which the human observations are provided by one or more air traffic controllers.

19. The method of claim 11 in which the data are derived from atmospheric computer simulation.

20. The method of claim 11 in which the augmented view is presented on a television or computer monitor.

21. The method of claim 11 in which the augmented view is presented in a heads-up-display.

22. The method of claim 11 in which the augmented view is presented in a heads-down-display.

23. The method of claim 11 in which the augmented view is presented in a display moveable by the user, and further comprising tracking the position of the display, to present an augmented view corresponding to the position of the display.

24. The method of claim 23 in which the augmented view is presented in a handheld binocular type of display.

25. The method of claim 23 in which the augmented view is presented in a handheld monocular type of display.

26. The method of claim 23 in which the augmented view is presented in a handheld movable display.

27. The method of claim 11 in which providing an image or view of the real world comprises taking a real image with an imaging device that is not worn on the user's head.

28. The method of claim 27 in which the viewpoint of the imaging device is a birds-eye-view.

29. The method of claim 27 in which the image of the real world is a static image.

30. The method of claim 27 in which the image of the real world is output from a radar.

31. The method of claim 27 in which the image of the real world is from a ground-based stationary imaging sensor from a known viewpoint.

32. The method of claim 27 in which the presenting step comprises displaying the augmented view on a fixed monitor.

33. The method of claim 27 in which providing an image or view of the real world comprises capturing an image with a camera that is mounted to a head-mounted or other portable display device.

34. The method of claim 11 in which information about the atmospheric phenomena is displayed to the user via text, where the text is drawn onto a view of a real background, appearing near the atmospheric phenomenon the text is describing, and the text is visually anchored to that physical phenomenon.

35. The method of claim 34 in which the textual display is displayed to the user at the same time that non-textual graphics are displayed to the user.

* * * * *